United States Patent

Lind

[15] 3,648,287
[45] Mar. 7, 1972

[54] FREQUENCY ADAPTIVE TRANSMITTER TO AVOID JAMMING

[72] Inventor: James N. Lind, Costa Mesa, Calif.
[73] Assignee: The United States of America as represented by the Secretary of the Air Force
[22] Filed: Dec. 18, 1969
[21] Appl. No.: 889,869

[52] U.S. Cl. .................................................343/18 E, 343/7 PF
[51] Int. Cl. .............................................................G01s 7/36
[58] Field of Search........................................343/7 PF, 18 E

[56] References Cited

UNITED STATES PATENTS 3,281,837  10/1966  Van Hijfte.......................343/18 E X Primary Examiner—T. H. Tubbesing
Attorney—Harry A. Herbert, Jr. and George Fine

[57] ABSTRACT

A frequency adaptive transmitter to avoid jamming wherein a combination of a frequency agile transmitter, a balanced amplifier and a directionally sensitive antenna senses that it is being jammed at a certain frequency and then retunes the transmitter to a frequency region free of the jamming signal.

2 Claims, 2 Drawing Figures

Patented March 7, 1972

3,648,287

INVENTOR.
JAMES N. LIND
BY
ATTORNEYS

3,648,287

FREQUENCY ADAPTIVE TRANSMITTER TO AVOID JAMMING

BACKGROUND OF THE INVENTION

The present invention relates to a frequency adaptive transmitter, and more particularly to a combination of a transmitter, a balanced amplifier, and a directional antenna which senses a jamming signal and automatically retunes the transmitter to avoid the jamming signal.

Microwave sensors are vulnerable to countermeasures such as active jamming. A sensor such as the microwave function of a fuze may be caused to malfunction by applying a simulated signal return. This is designed either to prefire or dud the fuze. Active jamming of this nature frequently comes from sources that are not in the major lobe of the antenna pattern. The prior art includes sophisticated circuitry to avoid jamming, however the present invention provides an extremely simple but efficient system for the purpose.

SUMMARY OF THE INVENTION

The present invention provides an active jamming protective system for proximity fuzes and other devices. The system becomes adaptive in that it can sense that the proximity fuze is being jammed at a certain frequency and then retunes the fuze transmitter to a frequency region free of the jamming signal.

The system of this invention requires an antenna that can detect an excessive signal level in the off-axis regions (side lobes). The antenna is connected to a balanced amplifier which has no output when the energy in the side lobes is normal. When the natural balance is disturbed, the balanced amplifier has an output which drives a tuning element of a tuned transmitter to adjust to a new frequency thus avoiding the jamming signal.

An object of the present invention is to provide an active jamming protective system for proximity fuzes wherein the jamming is sensed and the transmitter associated with the protective system is automatically retuned to a frequency region free of jamming.

Another object of the present invention is to provide a frequency adaptive transmitter for a proximity fuze which operates in combination with a directional antenna and a balanced amplifier wherein the combination senses a jamming signal and provides a signal to retune the transmitter to avoid jamming.

These and other advantages, features and objects of the invention will become more apparent from the following description taken in connection with the illustrative embodiment in the accompanying drawings, wherein: DESCRIPTION OF THE DRAWING G FIG. 1 shows one embodiment of the present invention partly in schematic and partly in block diagram form; and FIG. 2 shows a second embodiment of the present invention identical to FIG. 1 but further including a threshold circuit to avoid rapid changes.

DESCRIPTION OF THE PREFERRED EMBODIMENT

Figure 1:
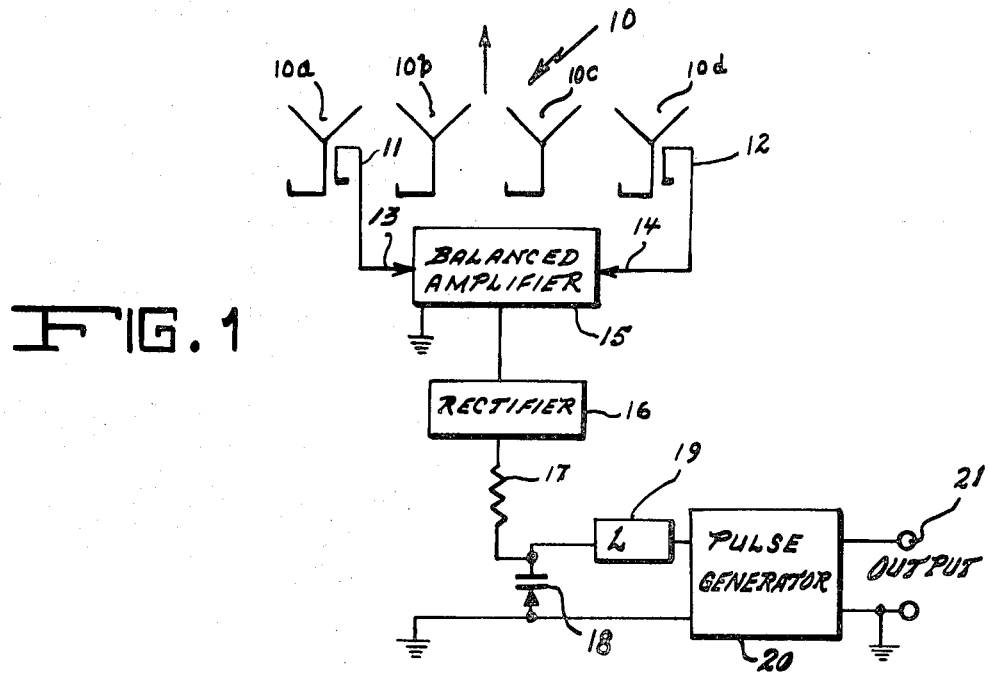

Now referring in detail to FIG. 1, there is shown antenna 10 having segments 10a, 10b, 10c, and 10d. The antenna is designed so that it can detect an excessive signal level in the off-axis region (side lobes). A segmented antenna of a phased-array nature lends itself readily to this purpose. A multisection dipole, slot or log spiral periodic antenna are also suitable. Standard antennas with an auxiliary omnidirectional antenna that have been used for side lobe cancellation schemes may also be utilized and meet the design requirements.

Balanced amplifier 15 receives signals from antennas 10a and 10d by way of couplers 11 and 12 and amplifier inputs 13 and 14, respectively. The output of balanced amplifier 15 is passed through rectifier 16 and resistor 17 and applied to varactor 18 as a DC-voltage. The varactor is connected to element 19 which is inductive and in combination with the capacity of varactor 18 provides a resonant circuit whose frequency is altered in accordance with the variation of the capacity of varactor 17. Element 19 is connected to pulse generator 20 which provides a pulse output at terminal 21.

In the operation of the embodiment of FIG. 1, antenna 10 is connected to balanced amplifier 15 which has no output when the energy in the side lobes is normal. Couplers 11 and 12 sense signal levels and energize unbalance in amplifier 15. When the natural balance is disturbed by a jamming signal, balanced amplifier 15 has an output which drives varactor 18 to adjust the resonant circuit of the transmitter to a new signal frequency free of the jamming signal which in turn controls pulse generator 20. Thus, there is provided a system which is adaptive in that it senses that it is being jammed at a certain frequency and then retunes the transmitter to a frequency region free of the jamming signal.

The tuned transmitter may be a bulk effect oscillator which has either a varactor, or a YIG (garnet) circuit element. A voltage or current can alter the reaction presented thereby changing the resonance of the circuitry.

The advantage that this system has is that the enemy must be radiating a strong signal and decision to adjust the new frequency may not be made because the electric counter measure (ECM) operator cannot see through his own signal. When the jamming signal is removed the transmitter returns to the original frequency.

Figure 2:
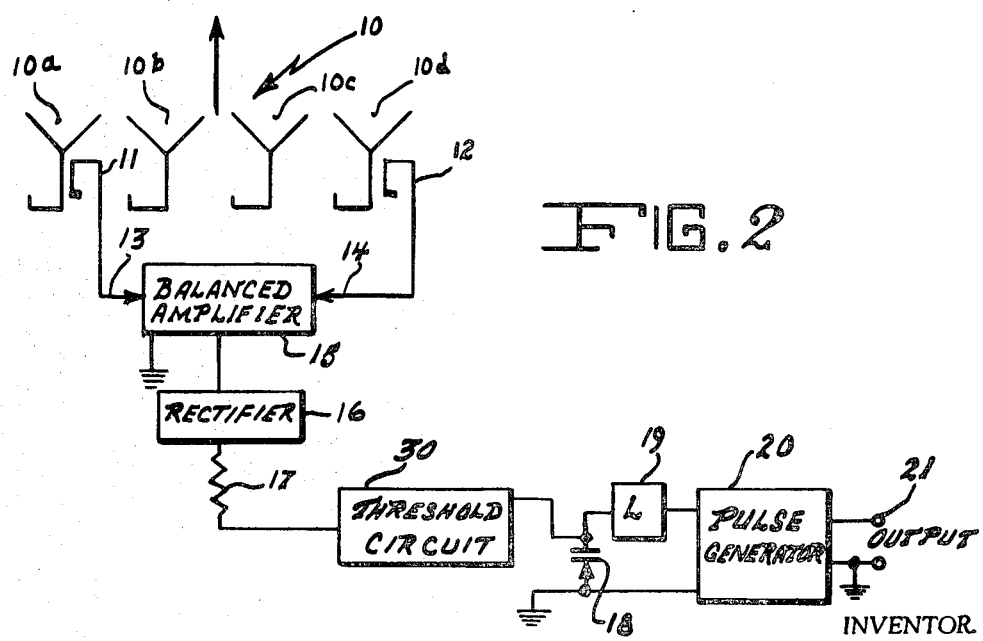

Now referring to FIG. 2 showing the second embodiment of the invention, there is included in the circuitry of FIG. 1 threshold circuit 30 interposed between resistor 17 and varactor 18. Threshold circuit 30 is adjusted to a predetermined level for the passage of signal energy to avoid rapid changes due to spurious responses from natural causes.

What is claimed is:

1. A frequency adaptive transmitter for a fuze proximity radar sensor to avoid jamming signals comprising a segmented antenna receiving signal energy and capable of detecting excessive signal level in the off-axis regions such as side lobes, said segmented antenna having multiple sections including a first section at one end and a second section at the other end, first and second couplers associated with said first and second sections, respectively, a balanced amplifier having first and second inputs, said first and second inputs being connected to said first and second couplers, respectively, said balanced amplifier having no output when the signal energy in said side lobes is normal and providing an output upon unbalance, a rectifier receiving the output of said balanced amplifier, a varactor, a resistance interconnecting said varactor and the output of said rectifier, a pulse generator, an inductance interconnecting said varactor and said pulse generator, said varactor and said inductance constituting a resonant circuit for said frequency adaptive transmitter, said resonant circuit being changed in frequency to a jam free region upon occurrence of said unbalance.

2. A frequency adaptive transmitter as described in claim 1 further including a threshold circuit interposed between said resistor and said varactor.

\* \* \* \* \*